US011067719B2

(12) United States Patent
Lambert et al.

(10) Patent No.: US 11,067,719 B2
(45) Date of Patent: *Jul. 20, 2021

(54) DISTRIBUTED WEATHER MONITORING SYSTEM

(71) Applicant: Fjord Weather Systems, LLC, Wilton, CT (US)

(72) Inventors: Drew Lambert, Wilton, CT (US); John Knag, New Boston, NH (US)

(73) Assignee: Fjord Weather Systems, LLC, Wilton, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/004,791

(22) Filed: Aug. 27, 2020

(65) Prior Publication Data

US 2020/0393596 A1 Dec. 17, 2020

Related U.S. Application Data

(63) Continuation of application No. 15/870,353, filed on Jan. 12, 2018, now Pat. No. 10,795,055.

(Continued)

(51) Int. Cl.
*G01W 1/06* (2006.01)
*G01W 1/04* (2006.01)
(Continued)

(52) U.S. Cl.
CPC ............. *G01W 1/06* (2013.01); *G01W 1/04* (2013.01); *G01P 5/02* (2013.01); *G01W 1/10* (2013.01);
(Continued)

(58) Field of Classification Search
CPC .......... G01W 1/10; G01W 1/06; G01W 1/04; G01W 1/14; G08B 21/10; G08B 19/00; G08B 21/182; H04W 4/021
See application file for complete search history.

(56) References Cited

U.S. PATENT DOCUMENTS 5,349,668 A  9/1994  Gladstein et al.
5,349,688 A  9/1994  Nguyen
(Continued)

FOREIGN PATENT DOCUMENTS

WO  2012060697 A2  5/2012

OTHER PUBLICATIONS

International Preliminary Report on Patentability Application No. PCT/US2018/014392 Completed: Dec. 11, 2018; dated Dec. 17, 2018 13 Pages.

(Continued)

*Primary Examiner* — Elias Desta
(74) *Attorney, Agent, or Firm* — Whitmyer IP Group LLC

(57) ABSTRACT

A distributed weather system includes a storage, a plurality of wireless weather stations, a server, and an interface. Each of the plurality of wireless weather stations is associated with a user and has a battery, a location sensor generating location information, an anemometer generating apparent wind speed, a transmitter transmitting the location information with the apparent wind speed to a network at periodic intervals, and a receiver receiving control commands that include a length of the periodic intervals. The server receives the location information with the apparent wind speed and stores them in the storage. The interface is accessible by a mobile computer, and receives the control commands from a user and sends them to the receiver of the wireless weather station associated with the user. The interface displays a true wind speed for each of the plurality of wireless weather stations, which is calculated using the apparent wind speed, the location information, and historical location information.

21 Claims, 2 Drawing Sheets

Related U.S. Application Data

(60) Provisional application No. 62/448,214, filed on Jan. 19, 2017.

(51) Int. Cl.
*G01P 5/02* (2006.01)
*G01W 1/00* (2006.01)
*G08B 19/00* (2006.01)
*G01W 1/10* (2006.01)
*H04W 84/18* (2009.01)
*H04W 4/021* (2018.01)
*G08B 21/18* (2006.01)
*G01W 1/14* (2006.01)
*G08B 21/10* (2006.01)

(52) U.S. Cl.
CPC ........ *G01W 1/14* (2013.01); *G01W 2001/006* (2013.01); *G08B 19/00* (2013.01); *G08B 21/10* (2013.01); *G08B 21/182* (2013.01); *H04W 4/021* (2013.01); *H04W 84/18* (2013.01)

(56) References Cited

U.S. PATENT DOCUMENTS

| | | | |
|---|---|---|---|
| 6,382,022 | B1 | 5/2002 | Martinez et al. |
| 6,424,295 | B1 | 7/2002 | Lange |
| 8,374,081 | B2 | 2/2013 | Farrugia et al. |
| 9,003,986 | B2 | 4/2015 | Jenkins et al. |
| 9,285,504 | B2 | 3/2016 | Dannevik et al. |
| 9,381,985 | B2 | 7/2016 | Jenkins et al. |
| 9,834,290 | B2 | 12/2017 | Jenkins et al. |
| 2004/0070515 | A1 | 4/2004 | Burkley et al. |
| 2004/0163102 | A1* | 8/2004 | Fowler ................ H04L 12/2825 725/12 |
| 2008/0132213 | A1 | 6/2008 | Rittman et al. |
| 2009/0132101 | A1 | 5/2009 | Gizara et al. |
| 2010/0013629 | A1 | 1/2010 | Sznaider et al. |
| 2011/0211465 | A1 | 9/2011 | Farrugia et al. |
| 2012/0268292 | A1 | 10/2012 | Rock |
| 2014/0251233 | A1 | 9/2014 | Bianchi et al. |
| 2018/0072393 | A1 | 3/2018 | Jenkins et al. |
| 2019/0293837 | A1* | 9/2019 | Smyth .................... G01W 1/02 |

OTHER PUBLICATIONS

PCT International Search Report & Written Opinion of the International Searching Authority Application No. PCT/US2018/014392 Completed: Mar. 15, 2015; dated Mar. 28, 2018 12 Pages.

U.S. Office Action U.S. Appl. No. 15/870,353 dated Feb. 24, 2020 31 Pages.

J.B Cohuet et al: "The Shipborne European Common Automatic IVeather Station (EUCAWS)", Sep. 28, 2016; Madrid; TECO; 18 Pages.

J.B Cohuet et al:"The Shipborne European Common Automatic Weather Station (EUCAWS)"; 2016 Madrid; TECO; 16 Pages.

Sterela Meteo: "Automatic Weather Stations"; 2017 Justaret (France); 12 Pages.

Sterela Meteo: "Marine Meteorology"; http://www.sterela-meteo.com/neptune.html (retrieved on Apr. 14, 2021).

"Sterela Meteo: specialists in designing and manufacturing of meteorological stations for surface observation."; http://www.sterela-meteo.com/index.html (retrieved on Apr. 29, 2021).

"neptune eucaws eng 2016"; Jun 29, 2016: https://www.youtube.com/watch?v=7plrHDhnT5g (retrieved on Apr. 29, 2021).

European Search Report of the International Searching Authority; Application No. EP 18741611; Completed: Nov. 19, 2020; 8 Pages.

* cited by examiner

DISTRIBUTED WEATHER MONITORING SYSTEM

TECHNICAL FIELD

The present teachings relate generally to a distributed weather monitoring system, and more particularly to a distributed weather monitoring system having multiple portable weather stations networked together to provide real-time monitoring of the weather.

BACKGROUND

Accurate, real-time, highly localized weather information is essential for human safety. Whether for transportation, or for recreational activities, people need to be adequately informed of the weather in order to make sound decisions. In addition to safety, accurate weather information helps people avoid uncomfortable situations, e.g. getting caught in the rain. Weather information impacts everyone from sailors at sea to pilots in the air, allowing them to plan accordingly and accomplish their respective tasks and goals.

Environmental sensors and remote sensing technologies have been used in the past to monitor weather. For example, U.S. Pat. No. 5,920,827, entitled Wireless Weather Station, discloses a stationary system for collecting weather information. However, known systems are incapable of providing real-time, highly localized information in a mobile setting using portable modular weather stations. Without modularity, known systems are less adaptable to a user's specific purpose. In addition, known systems are typically stationary, large, and bulky making them incapable of quick deployment or use in a mobile setting. Further, prior art systems do not have advanced networking capabilities, limiting their applications for providing real-time information.

Aspects of the present invention are directed to these and other problems.

SUMMARY

The needs set forth herein as well as further and other needs and advantages are addressed by the present embodiments, which illustrate solutions and advantages described below.

According to an aspect of the present invention, a distributed weather monitoring system includes a storage, a plurality of wireless weather stations, a server, and an interface. Each of the plurality of wireless weather stations is associated with a user and has a battery for providing portability of the wireless weather station, a velocity sensor generating velocity information indicative of both speed and direction of movement of the wireless weather station, an anemometer generating an apparent wind signal indicative of both apparent speed and apparent direction of the wind, and a transmitter transmitting the velocity information and apparent wind signal to a network. The server receives the velocity information and apparent wind signal and stores them in the storage. The interface displays true wind data for each of the plurality of wireless weather stations, which is calculated from the apparent wind signal and velocity information.

According to another aspect of the present invention, a distributed weather monitoring system includes a storage, a plurality of wireless weather stations, a server, and an interface. Each of the plurality of wireless weather stations is associated with a user and has a battery for providing portability of the wireless weather station, a location sensor generating location information as a function of time, an anemometer generating an apparent wind signal indicative of both apparent speed and apparent direction of the wind, a transmitter transmitting the location information and the apparent wind signal to a network. The server receives the location information with the apparent wind signal and stores them in the storage. The interface displays true wind data for each of the plurality of wireless weather stations, the true wind data calculated from the apparent wind signal and using a velocity of the wireless weather station derived from the location information from at least two points in time.

In addition to, or as an alternative to, one or more of the features described above, further aspects of the present invention can include one or more of the following features, individually or in combination:

- Each of the plurality of wireless weather stations also includes a location sensor for generating location information which is transmitted by the transmitter to the network. The server associates the velocity information and apparent wind signal with the location information, and the interface displays the true wind data by location using the location information;
- The velocity sensor is an inertial measurement unit generating inertial navigation information;
- The inertial navigation information is used to calculate wave height and wave frequency, and the interface displays the wave height and wave frequency along with the location information;
- Each of the plurality of wireless weather stations also includes a weather sensor for generating weather information, the transmitter sends the weather information along with the location information and inertial navigation information to the network, the server receives the weather information with the location information and the inertial navigation information and stores it in the storage, and the interface displays the weather information for each of the plurality of wireless weather stations along with the true wind data;
- The weather sensor is selected from the group consisting of a thermometer, a barometer, a hygrometer, an anemometer, a pyranometer, a rain gauge, a disdrometer, a transmissometer, a ceilometer, pollen sensor, $CO^2$ sensor, and combinations thereof. In addition, the weather information is selected from the group consisting of temperature, pressure, humidity, wind speed, solar radiation, precipitation, drop size distribution, visibility, cloud ceiling, pollen count, $CO^2$, and combinations thereof;
- An alerter for generating an alert to inform a user of a current weather condition, where the user defines a first weather parameter, and the alerter is configured to generate the alert when the first weather parameter is reached;
- Each of the plurality of wireless weather stations includes a receiver. The interface is accessible by a mobile computer of the user associated with the wireless weather station, and the interface receives control commands from the user. The transmitter transmits the location information and the apparent wind signal to the network at periodic intervals. The receiver of the wireless weather station associated with the user receives control commands, and the control commands include a length of the periodic intervals;
- Each of the plurality of wireless weather stations also includes a solar panel adapted to charge the battery;

Each of the plurality of wireless weather stations is programmed to automatically shut down when the battery level is nearly depleted in order to preserve power;

The network is a mobile phone network;

The network is a satellite network;

At least one of the plurality of wireless weather stations are connected to at least one other of the plurality of wireless weather stations via an ad hoc peer-to-peer network;

The ad hoc peer-to-peer network is established using VHF radio;

A social network for the user to share data with one or more additional users.

For a better understanding of the present embodiments, together with other and further aspects thereof, reference is made to the accompanying drawings and detailed description, and its scope will be pointed out in the appended claims.

DETAILED DESCRIPTION

Figure 1:
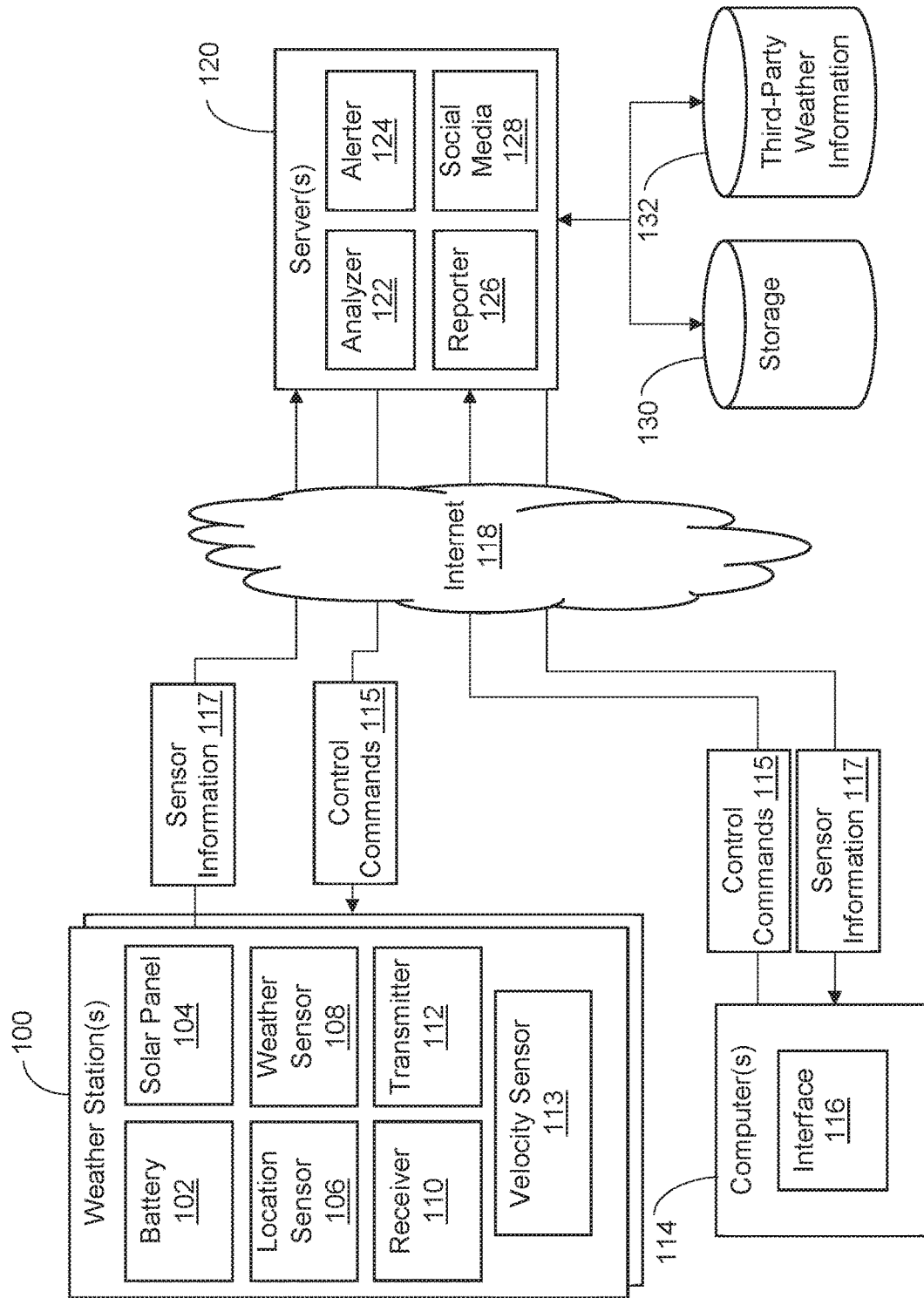
FIG. 1 is a schematic diagram of one embodiment of a system according to the present teachings.

The present teachings are described more fully hereinafter with reference to the accompanying drawings, in which the present embodiments are shown. The following description is presented for illustrative purposes only and the present teachings should not be limited to these embodiments. Any computer configuration and architecture satisfying the speed and interface requirements herein described may be suitable for implementing the system of the present embodiments.

For purposes of explanation and not limitation, specific details are set forth such as particular architectures, interfaces, techniques, etc. in order to provide a thorough understanding. In other instances, detailed descriptions of well-known devices, circuits, and methods are omitted so as not to obscure the description with unnecessary detail.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second" etc. for different features/components of the present disclosure are only intended to distinguish the features/components from other similar features/components and not to impart any order or hierarchy to the features/components.

The present teachings are directed to a network of real-time weather stations. In one embodiment, the system comprises a mobile, location-enabled (e.g., GPS, etc.), cellular-equipped mobile device (referred to as "weather station") that transmits sensed weather data to a cloud-based network. The network may be accessible in real-time through a smartphone, tablet, laptop or similar device. Users can subscribe to enable access to weather stations on the network. In this way, clusters of local, real-time weather stations may create weather subnetworks to enhance end-user safety, promote end-user communications, and ultimately improve weather forecasts by capturing real-time data.

The weather station may be portable and provide real-time monitoring as it travels. This is facilitated by a built-in locator that allows the device to transmit sensed weather-related data with location. Designed as a small, integrated consumer device, it can be easily mounted (e.g., to a sailboat mast, to a buoy, to a drone, etc.). The weather station may transmit data in real-time to the cloud network, which data may be time-stamped, GPS-tagged, and stored in the database for future use. The weather station may be waterproof and solar powered with battery backup.

Transmission of data may utilize the Global System for Mobile Communications (GSM) protocol, although not limited thereto. GSM is a standard protocol developed for mobile devices. The weather data may be combined with location data (e.g., GPS coordinates, etc.) in a single transmission. In addition to cellular technology, transmission may also include use of satellite networks. This may be preferable when out of range of land. However, use of a short messaging service (SMS) may be less expensive and use less energy. One skilled in the art would appreciate that other communication protocols may be used (e.g., Wi-Fi, Bluetooth, etc).

The weather station may be modular and incorporate a number of different sensors. The weather sensors may include an anemometer, thermometer, a barometer, a hygrometer, an anemometer, a pyranometer, a rain gauge, a disdrometer, a transmissometer, a ceilometer, pollen sensor, $CO^2$ sensor, and various numbers and combinations thereof. Sensors may detect temperature, pressure, humidity, wind speed, solar radiation, precipitation, drop size distribution, visibility, cloud ceiling, pollen count, $CO^2$, although not limited thereto. The weather stations may also include local processors and processing of the sensor data, or transmit the data to a server for processing. The modular nature means that sensors can be added/removed as desired. It is also possible to include a camera.

Users may interact with controls on the weather station, such as to change device settings, by using a smartphone or tablet, although not limited thereto. Functions that may be controlled remotely by the user include adjustment of data transmission rates, the ability to turn the device on and off, program notifications and alerts based on various sensors, and control of an integrated camera, although not limited thereto. For example, the user may monitor battery levels and, based on solar charge rates, adjust transmission rates to ensure battery longevity.

The device may be powered by a battery that is recharged by a solar panel, although not limited thereto. Although the user may program "downtime" for the unit, including shutting off transmission to save battery life, the unit may be "self-preserving", and automatically shut down and recharge when it reaches a predetermined battery level, and then turn back on when battery level returns to normal.

The weather station may also have a processor and storage. This may be used to calculate weather data, although not limited thereto. For example, the device may store direction and speed of movement and compare it with the apparent wind speed and direction in order to resolve true wind speed. The device may then transmit the true wind speed with apparent wind speed to the network. In another embodiment, this resolution may be performed by a server and not by the weather station. The storage may also store wind speed in order to measure gusts (e.g. highest wind speed for past hour, etc.). It is to be appreciated that weather data may be stored on the weather station as desired or otherwise permitted by available storage, and the present teachings are not limited to any particular embodiment disclosed herein.

The weather station may integrate with existing sensor networks. For example, the Automatic Identification System (AIS) is a tracking system used on ships and by vessel traffic services (VTS) for identifying and locating vessels by electronically exchanging data with other nearby ships, AIS base stations, and satellites. In addition, many vessels already have existing anemometer and display systems. Many boats use the National Marine Electronics Association (NMEA) electrical and data specification for communication between marine electronics such as echo sounder, sonars, anemometer, gyrocompass, autopilot, GPS receivers and many other types of instruments. The weather station may communicate with any of these systems using the appropriate communication protocols. Specifically, the weather station may use VHF radio or AIS to establish ad-hoc networks between stations, or use satellite communication when outside of cellular or VHF range.

A system according to the present teachings introduces a number of benefits. For example, the system integrates components in a way that has not been achieved before. The system may develop an adaptable weather "scene" that may be constantly updated due to the non-fixed (e.g., mobile, etc.) real-time nature of the platform as well as meteorological prediction methods based on the dynamic data. As weather stations move through a weather system it may be possible to determine additional characteristics of the weather. Further, the system may use one or more novel sensing technologies to provide more accurate sensing of environmental conditions, wind speed and direction in particular, at a reduced cost when compared to existing sensor technologies.

One goal is to increase safety in the aviation and maritime fields by giving pilots and captains access to up-to-the-minute weather data in their flight/travel path, as well as at their destinations. For example, first responders may have units that transmit real-time weather conditions to medevac helicopters landing in the area. Helicopter pilots flying to offshore oil rigs may have access to data points along their route from boats, buoys, and other vehicles that would allow them to make better, more-informed decisions using real-time, GPS-specific data. Mariners may know about severe weather in real-time by accessing previously non-existent data points that supplement the NOAA buoy system. Users at a golf course can benefit from weather data provided at carts and pins. One skilled in the art would appreciate that weather stations could be positioned anywhere (whether stationary or mounted to a moving vehicle) and report real-time weather data to the network for improved comprehension of weather.

Referring now to FIG. 1, shown is a schematic diagram of one embodiment of the system according to the present teachings. Weather station(s) 100 (e.g., mobile device(s)) may provide sensed weather information to a network, although not limited thereto. Sensed data (e.g., wind/location, etc.) may be sent by the weather station 100 to a cloud-based storage network. This data may be collected at one or more servers 120, archived in one or more storages 130, and made available via the Internet 118.

One or more batteries 102 may power the weather station 100. The battery or batteries 102 may be charged by a solar panel 104 that may be incorporated into the device. The weather station may be "self-preserving" and automatically shut down and recharge when it reaches a predetermined threshold, turning back on when battery levels return to normal. This may be a setting that can be controlled by a user.

One or more weather sensors 108 may detect weather conditions. For example, in one embodiment the weather station 100 includes an anemometer. The weather station may transmit the location information (e.g., using location sensor 106) along with weather data to the server 120 using a transmitter 112. Transmitting weather and location data simultaneously may not only reduce bandwidth, but allow easy indexing of the data. In another embodiment, the weather station 100 includes a velocity sensor 113. The velocity sensor 113 may be, for example, an inertial measurements unit, which provides data including specific force, angular rate, and magnetic fields. The data produced by the velocity sensor 113 may be part of an inertial navigation system, which analyzes the data from the velocity sensor 113 to determine the velocity, acceleration, and change in position of the device. This can supplement or replace location information from a GPS system in the device, or be used to estimate weather information, e.g. wave height and frequency. In other embodiments, location of the weather station is determined via external components via, e.g. using triangulation.

An analyzer 122 may analyze the weather data. For example, in one embodiment, using wind speed and location information the analyzer 122 may calculate true wind speed. Knowing the speed of travel of the weather station 100 and the measured apparent wind speed allows calculation of true wind speed. This may include use of historical location information of the weather station 100 that may be stored in storage 130. In one embodiment, this calculation may be performed on the weather station 100 and then transmitted to the server 120. For example, the location information can be used to calculate a distance (i.e. displacement) between two points, and this distance divided by the time it took for the weather station 100 to move from the first point to the second point gives an average velocity ($\Delta x/\Delta t$). In another embodiment, the analyzer 122 uses data from the inertial measurement unit 113 such as acceleration and angular velocity data to calculate sea state, wave height, and wave frequency.

Users may access the data, receive alerts, and control one or more weather stations 100 over the Internet 118 using computers 114 (e.g., mobile devices, smartphones, tablets, laptops, desktop computers, etc.). An interface 116 (e.g., app, webpage, etc.) may provide a convenient and customizable dashboard of weather data received from the server(s) 120. Data may be provided by a reporter 126. The weather station 100 may send sensor information 117 (e.g. weather/location information) to the computer 114 via the internet 118 and through the server 120. Users may send control commands 115 to the weather station 100 via the server 120 and the internet 118. Control commands can be used to, e.g. set the length of the periodic intervals of data transmission by the weather station 100.

The storage 130 may include user profiles. A user may create an account on the system and register one or more weather stations 100 using a unique identifier that identifies the weather station. In this way, the weather station may provide out-of-the-box functionality and connect to a cellular network and send weather and location data to the server 120 to be provided over the Internet.

A user may also issue commands to the weather station 100 and/or server 120. An interface 116 including an app and/or a website may be used to control a user's settings and mobile device. The user may control any number of aspects of the weather station 100 using a smartphone or other computer 114. Control commands may be received by the server 120 and/or the receiver 110 on the weather station 100, although not limited thereto.

An alerter 124 may allow a user to set and receive alerts. For example, the user may predefine weather parameters (e.g. weather-related occurrences in particular areas of interest), although not limited thereto. If the weather parameter is reached or detected at the one or more areas of interest (e.g., wind over 30 MPH, lighting detected, etc.), the user may receive an alert or notification. The user may also create combined alerts (e.g., dropping barometer pressure and temperature below 65° F., wind over 10 MPH and temperature over 65° F., etc.). Alerts may also be generated based on battery level and/or shutdown of the mobile device, although not limited thereto. As would be appreciated by one skilled in the art, alerts can be created to monitor any number of situations and can be set and received via interface 116 on a mobile device 114, by text, by email, or by similar methods. The alerter may be software executing on the server 120, although not limited thereto.

The user may also define a specific geographical area and receive alerts from any of weather stations in that area. A user may geofence an area of interest and receive alerts from that area. For example, if a user intends to travel along a predetermined route, the user may select the route (e.g., draw a circle using interface 116, etc.) and set up alerts for that area. The user also may be able to select specific weather stations and receive alerts from any of those. All alerts may be controlled through the user interface 116, as well as the control (e.g., hours of operation, battery shutoff, etc.) of the user's own weather station. A smartphone app provides the user with a powerful user interface to control all aspects of the user's weather station and use of the network.

Social networks (e.g., private subnetworks, social circles, etc.) may be created. A social media component 128 may organize social networks and/or interact with other social network systems (e.g. FACEBOOK®, etc.). For example, owners of weather stations 100 may join social networks concerning a geographic region or recreational facility (e.g., yacht club). Joining the network (e.g., subscribing) may not only give a user access to other weather stations on that network, but also make that user's weather station 100 available to that network. For example, all members of a certain organization (e.g., yacht club, airport, marina, golf club, ski resort, etc.) may join a certain social network in order to share their weather information with each other. Such subnetworks can also be based on weather and position, although not limited thereto.

An overlay of third-party weather information 132 may supplement data sensed by the weather stations and give users unprecedented real-time weather coverage. The system may communicate with publicly-available (or subscription-based, etc.) weather and map providers, although not limited thereto. Better data may lead to better decision-making for recreational and commercial users, which in turn may lead to higher safety levels and better overall understanding of local weather systems.

Figure 2:
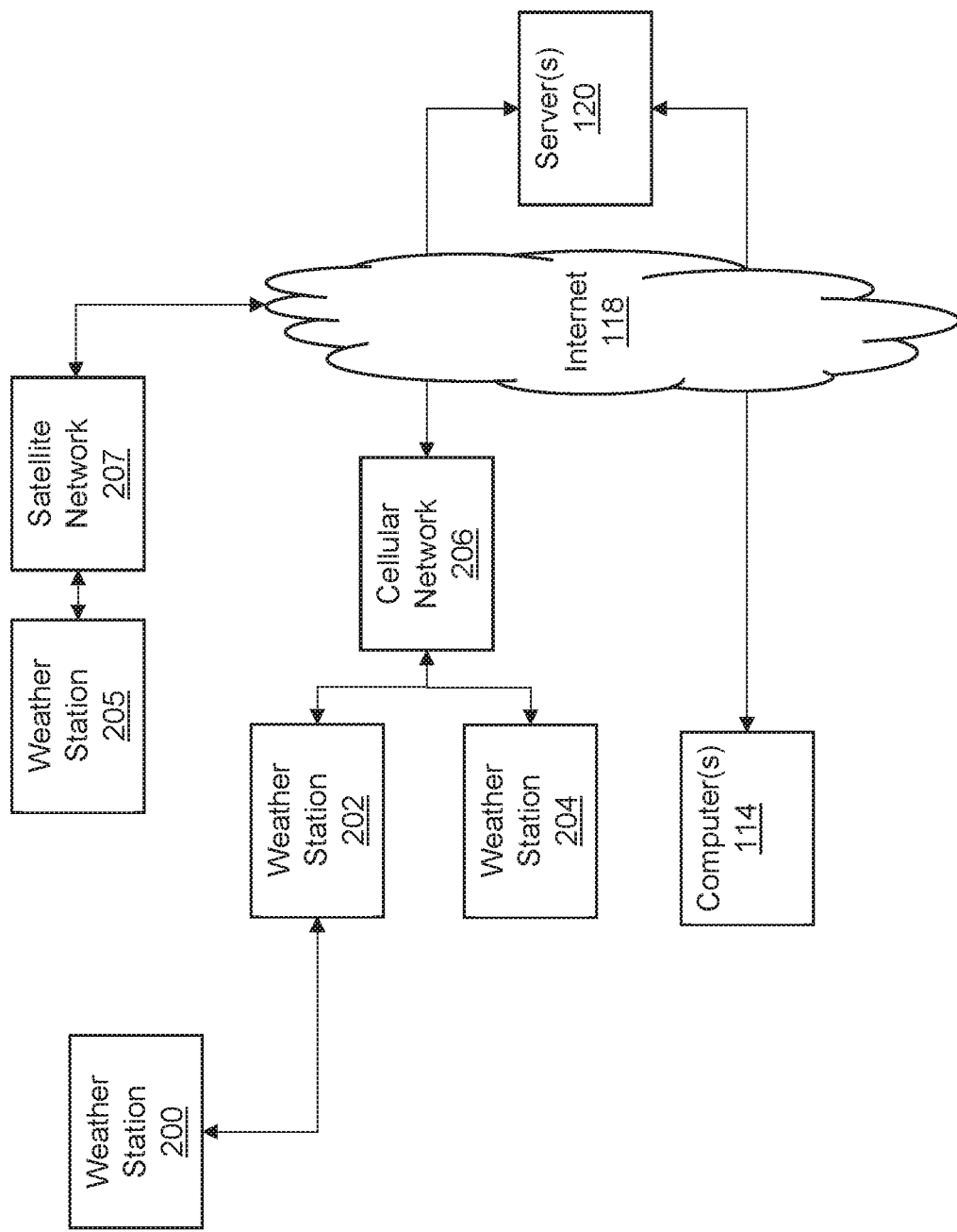
FIG. 2 is a schematic diagram of one embodiment of an ad hoc network using the weather system of FIG. 1.

Referring now to FIG. 2, shown is a schematic diagram of one embodiment of an ad hoc network using the weather system of FIG. 1. A weather station 200 may not always be in range of a communication/cellular network 206. In one embodiment, weather stations 200, 202, 204 may create ad hoc peer-to-peer networks so that a weather station 200 can create a path to the communication network 206. For example, if a first weather station 200 is on a mountain and out of cellular range, the first weather station 200 may communicate with additional weather station(s) 202, 204 located down the mountain that will retransmit data provided by the first weather station 200 so that it reaches the communication network 206. The weather station 205 is connected to the system via a satellite network 207, which may provide an alternative to the ad hoc network when a weather station is outside of the range of both the cellular network 206 and another weather station.

While the present teachings have been described above in terms of specific embodiments, it is to be understood that they are not limited to these disclosed embodiments. Many modifications and other embodiments will come to mind to those skilled in the art to which this pertains, and which are intended to be and are covered by both this disclosure and the appended claims. It is intended that the scope of the present teachings should be determined by proper interpretation and construction of the appended claims and their legal equivalents, as understood by those of skill in the art relying upon the disclosure in this specification and the attached drawings.

What is claimed is:

1. A weather monitoring system, comprising:
  a wireless weather station having:
    a sensor generating velocity information indicative of both speed and direction of movement of the wireless weather station;
    a processor receiving an apparent wind signal from an anemometer, the apparent wind signal being indicative of both apparent speed and apparent direction of the wind; and
    a transmitter transmitting the velocity information and apparent wind signal to a network;
  a server receiving the velocity information and apparent wind signal; and
  an interface displaying true wind data for the wireless weather station, the true wind data calculated from the apparent wind signal and velocity information.

2. The weather monitoring system of claim 1, wherein the wireless weather station further comprises another sensor for generating location information;
  the location information is transmitted by the transmitter to the network;
  the server associates the velocity information and apparent wind signal with the location information; and
  the interface displays the true wind data by location using the location information.

3. The weather monitoring system of claim 2, wherein the wireless weather station further comprises another sensor for generating weather information;
  the transmitter sends the weather information to the network;
  the server receives the weather information and associates it with the location information; and
  the interface displays the weather information for the wireless weather station along with the true wind data.

4. The weather monitoring system of claim 3, wherein:
  said another sensor for generating weather information comprises a thermometer, a barometer, a hygrometer, an anemometer, a pyranometer, a rain gauge, a disdrometer, a transmissometer, a ceilometer, a pollen sensor, a $CO^2$ sensor, or a combination thereof; and
  the weather information comprises temperature, pressure, humidity, wind speed, solar radiation, precipitation, drop size distribution, visibility, cloud ceiling, pollen count, $CO^2$, or combinations thereof.

5. The weather monitoring system of claim 1, wherein the sensor is an inertial measurement unit.

6. The weather monitoring system of claim 1, wherein the server generates an alert when at least one defined weather parameter is reached, and the interface displays the alert which provides a current weather condition.

7. The weather monitoring system of claim 1, wherein the wireless weather station is installed on a seafaring vessel and receives power from the seafaring vessel.

8. A weather monitoring system, comprising:
a plurality of wireless weather stations, each having:
  a sensor generating location information as a function of time;
  an anemometer generating an apparent wind signal indicative of both apparent speed and apparent direction of the wind; and
  a transmitter transmitting the location information and the apparent wind signal to a network;
a server receiving the location information and the apparent wind signal, the server calculating true wind data for each of the plurality of wireless weather stations using the apparent wind signal and a velocity of the respective weather station, the velocity being derived from the location information from at least two points in time.

9. The weather monitoring system of claim 8, further comprising:
an interface displaying the true wind data for at least one weather station of the plurality of wireless weather stations;
wherein each of the plurality of wireless weather stations includes a receiver;
the interface is accessible by a computer and configured to receive control commands; and
the receiver of the at least one weather station receives the control commands.

10. The weather monitoring system of claim 8, wherein at least one weather station of the plurality of wireless weather stations further comprises a solar panel adapted to charge a battery that powers the at least one weather station.

11. The weather monitoring system of claim 8, wherein the network comprises a satellite network, a mobile phone network, an Automatic Identification System AIS network, a VHF radio network, or combination thereof.

12. The weather monitoring system of claim 8, wherein at least one of the plurality of wireless weather stations is connected to at least one other of the plurality of wireless weather stations via an ad hoc peer-to-peer network.

13. The weather monitoring system of claim 12, wherein the ad hoc peer-to-peer network is established using VHF radio.

14. A weather system, comprising:
a plurality of wireless weather stations, each having:
  a sensor generating velocity information indicative of both speed and direction of movement of the wireless weather station;
  an anemometer generating an apparent wind signal indicative of both apparent speed and apparent direction of the wind;
  a processor using the apparent wind signal for comparing with the velocity information to determine true wind data; and
  a transmitter transmitting the true wind data to a network;
a server receiving the true wind data from at least one weather station of the plurality of wireless weather stations; and
an interface displaying the true wind data.

15. The weather system of claim 14, wherein the transmitter of the at least one weather station transmits the apparent wind signal to the network, and the server receives the apparent wind signal.

16. The weather system of claim 14, wherein each wireless weather station measures wind gusts.

17. The weather system of claim 14, wherein the sensor is an inertial measurement unit.

18. The weather system of claim 14, wherein each wireless weather station comprises another sensor for generating location information, the location information is transmitted by the transmitter to the network;
wherein the server receives the location information from the at least one weather station and associates the true wind data with the location information; and
wherein the interface displays the true wind data by location using the location information.

19. The weather system of claim 14, wherein the network comprises a satellite network, a mobile phone network, an Automatic Identification System (AIS), a VHF radio network, or a combination thereof.

20. The weather system of claim 14, wherein the at least one weather station is installed on a seafaring vessel.

21. The weather system of claim 14, wherein the wireless weather station has at least one other sensor to measure wave height, wave frequency, pressure, temperature, humidity, solar radiation, precipitation, drop size distribution, visibility, cloud ceiling, pollen count, or carbon dioxide concentration.

* * * * *